Figure 1:
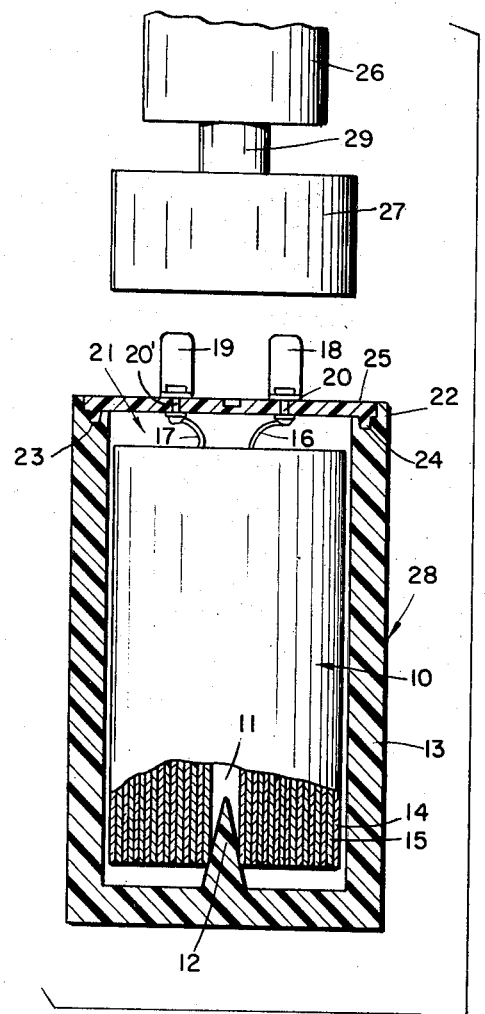

United States Patent
Braiman et al.

[15] 3,680,203
[45] Aug. 1, 1972

[54] ENCAPSULATING OF ELECTRONIC COMPONENTS BY ULTRASONIC WAVE ENERGY

[72] Inventors: Jerry Braiman; John B. Greskamp, both of Indianapolis, Ind.

[73] Assignee: P.R. Mallory & Co., Inc., Indianapolis, Ind.

[22] Filed: July 9, 1971

[21] Appl. No.: 161,301

Related U.S. Application Data

[60] Continuation of Ser. No. 852,139, July 29, 1969, abandoned, Division of Ser. No. 659,507, Aug. 9, 1967, abandoned.

[52] U.S. Cl. ................................ 29/570, 317/230
[51] Int. Cl. ........................ H01g 9/08, H01g 13/00
[58] Field of Search ......... 317/230, 231, 233; 29/570

[56] References Cited

UNITED STATES PATENTS

| | | | |
|---|---|---|---|
| 2,197,193 | 4/1940 | Pontis | 317/230 |
| 2,628,271 | 2/1953 | Brafman | 317/260 |
| 3,168,613 | 2/1965 | Palmer | 174/65 |
| 3,224,916 | 12/1965 | Saloff et al. | 156/73 |
| 3,320,807 | 5/1967 | Taylor et al. | 156/73 |
| 3,438,824 | 4/1969 | Balamuth | 29/470.1 |

FOREIGN PATENTS OR APPLICATIONS

| | | | |
|---|---|---|---|
| 757,804 | 9/1956 | Great Britain | 317/230 |
| 778,853 | 7/1957 | Great Britain | 317/230 |

*Primary Examiner*—James D. Kallam
*Attorney*—Richard H. Childress and Robert F. Meyer

[57] ABSTRACT

The open ends of thermoplastic containers encapsulating electronic components are closed with a compatible plastic material, the materials being sealed by ultrasonic welding with joints constructed and fitted together for retaining the heat within the joint during the welding.

2 Claims, 2 Drawing Figures

PATENTED AUG 1 1972
3,680,203

INVENTORS
JERRY BRAIMAN
BY JOHN B. GRESKAMP

Henry W. Cummings
ATTORNEY

ENCAPSULATING OF ELECTRONIC COMPONENTS BY ULTRASONIC WAVE ENERGY

This application is a continuation of application Ser. No. 852,139, filed July 2, 1969, which is now abandoned. Application No. 852,139 was a division of application No. 659,507, filed Aug. 9, 1967, which is abandoned also.

This invention is generally concerned with the encapsulation of electronic components such as batteries and capacitors. Therefore, although the invention will be described with particular reference to capacitors, it should be understood that the invention need not be so limited.

Prior experience in the capacitor art has clearly established the need for providing efficient protective sealing of capacitor units. Among the important considerations giving rise to this need are the following: resistance to moisture, resistance to chemical attack, resistance to vapors, resistance to heat distortion, mechanical rigidity, containment of the electrolyte, and preservation of electrical properties.

Prior to this invention, the body of a capacitor was encapsulated in a metallic or plastic can wherein the open end was closed by a combination top compressively retained in the open end by a suitable resilient ring-like material. The combination top was generally made of two layers pressed together. The layer of the combination top abutting the can was typically fabricated from an easily compressing material such as rubber. The other or outer layer of the combination top was typically made of some rigid insulating material such as a phenolic or the like. The rubber was generally used to compressively yield under the compressing forces exerted by the resilient ring, thereby forming an acceptable end seal.

It is seen that the housing of the capacitor was therefore composed of three separate and distinct parts, that is, the metallic or plastic can, the combination top of the resilient end which necessitates using several different types of materials and several separate and distinct handling steps thereby increasing the manufacturing costs of the capacitor.

In addition, if the ring was not seated properly, if the combination top was not seated properly, or if the components of the combination top were not mated properly, the end seal would not be effective for sealing the capacitor.

The present invention is concerned with sealing the open ends of electronic component containers and has as one of its objects a method of closing the open end of such a container using a single plastic material.

Another object of the invention is the provision of a method of closing the open end of a plastic container with a single plastic material utilizing ultrasonic welding.

Another object of the invention is to provide a method of closing the open ends of a container for electronic components wherein thermoplastic materials placed in interlocking relationship are welded together through the heat generated by the vibrations emitted by an ultrasonic device.

Still another object of the invention is to provide a method of heat sealing the materials at the joint formed by the interlocking relationship of the materials.

Another object of the invention is to provide a method of closing the ends of capacitor containers which is simple and economical.

Still another object of the invention is to provide a method of ultrasonically welding an end closure to a capacitor container to provide an excellent mechanical bond.

Another object of the invention is to provide a method of ultrasonically welding together two halves of a capacitor container fabricated of a plastic material.

With the above and other objects in view, which will appear as the description proceeds, this invention resides in a method of closing and sealing capacitor containers substantially as described herein and more particularly defined by the appended claims, it being understood that such changes in the precise embodiment of the invention here disclosed may be made as come within the scope of the claims.

Figure 2:
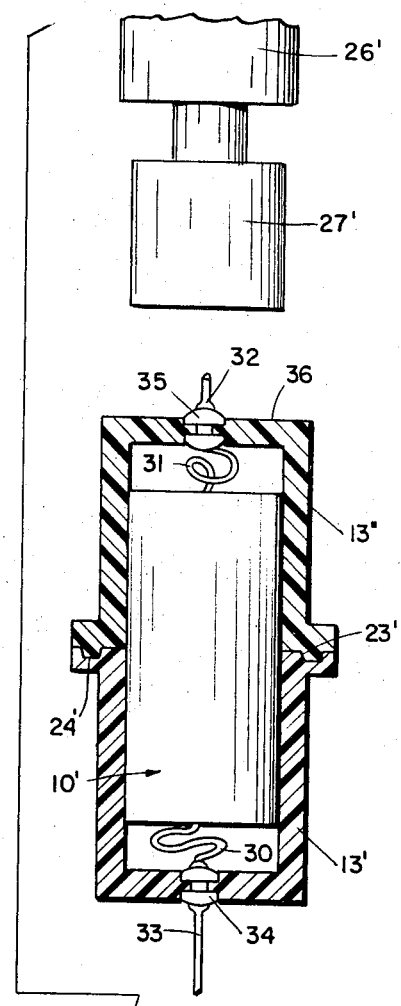

In the drawings:

FIG. 1 is a vertical elevation in partial cross section showing the relationship of a typical capacitor and an ultrasonic welding head used in carrying out the method of the invention; and FIG. 2 is a vertical elevation in partial cross section showing the same relationship of another typical capacitor.

Generally speaking, the objects of the invention are accomplished by providing an open ended thermoplastic sleeve inserting a formed electronic component into the sleeve, placing an end closure of a material compatible to the material of the sleeve over the open end of the sleeve, the end closure being held in interlocking relationship with the sleeve, and ultrasonically welding the sleeve and the end closure together at the interlocking joint to form a container of a single unitary construction to encapsulate the electronic component.

Referring now to the drawings, and especially to FIG. 1, an electronic component such as a convolutely wound capacitor body 10, is substantially cylindrical in shape, with a portion of its center 11 being removed for insertion over the pointed element 12 which extends from the bottom portion of encapsulating container 28. Container 28 is fabricated in two sections, an open ended sleeve 13 and end closure means 25. The body 10 is usually not more than a fraction of an inch in diameter and not more than 2 inches in length, although it need not be confined to these specifications. The illustrated example shown herein is an aluminum foil sheet 14 interwound with an absorbent material 51 such as paper, and impregnated with a liquid electrolyte such as a compounded mixture consisting principally of ethylene glycol and boric acid, although not limited to such. Terminal wires 16 and 17 extend from the body 10 and are electrically connected to electrical terminals 18 and 19 through some suitable means such as rivets 20 and 20'. Capacitor sleeve 13 has an open end 21 formed by rim portion 22. Rim portion 22 has a circular groove 23 into which a corresponding circular tongue 24 of end closure means 25 is mated. In the embodiment of FIG. 1, end closure means consists of a substantially flat disc. The method of the assembly of the capacitor body into the container 28 will be hereinafter described.

The formed capacitor body 10 with the end closure means 25 and the terminal wires connected to it is first inserted into the sleeve 13. End closure 25 is mated such that tongue 24 is fitted into groove 23 of the sleeve 13 to form a tongue and groove interlocking joint. An ultrasonic welding head 26 having a suitably shaped horn 27 is brought into working relationship with the end closure such that the tongue and groove joint can be welded to form a single unitarily constructed container for encapsulating the capacitor body. Horn 27, which, as previously stated, may be of any suitable shape, is connected to welding head 26 through shaft extension 29.

Welding head 26 is, in practice, a sonic converter for converting the alternating current from a power supply (not shown) into mechanical vibrations at the same frequency. Such frequencies are usually in the ultrasonic range of from 20,000 vibrations per second. Preferably horn 27 needs to be of a suitable shape such that it can be placed against the closure 25 to more readily transmit mechanical vibration through the closure and to maintain pressure against the closure, thus setting up an ultrasonic wave path which travels radially through the end closure. Any discontinuity in the ultrasonic wave path produces dissipation of energy resulting in the release of heat. In the present invention, the discontinuity appears in the tongue and groove interlocking joint between the end closure 25 and sleeve 13. Heat is released at the joint, and the closure and the sleeve become integrally bonded under pressure from the horn to form a unitary container 28 to thus encapsulate the capacitor body 10. It is to be understood that the capacitor body with the sleeve 13 would be held in a suitable jig or fixture to enable the process to be carried out efficiently.

Generally speaking, sleeve 13 as well as end closure 25 is made of a plastic material which has a low attenuation to sonic propogation in order to insure that the ultrasonic vibrations will be efficiently transmitted through the material. In addition, the materials need to be chosen with due regard to their use in encapsulating the electronic component. For components such as capacitors and batteries, sleeve 13 and the end closure 25 may be fabricated from a thermoplastic material such as polypropylene, polyamide, polystyrene, polycarbonate and polyacetate resins. However, polypropylene resins are preferred for economic reasons and for physical properties desired.

A good integral bond is dependent to a great degree on the design of the joint. In general, it is important to have only a small portion of the joint in contact at one time so that melting takes place rapidly. If too much plastic is in contact at one time, the part itself acts as a heat sink and simply draws heat away from the joint area so that the plastic never reaches its critical melting temperature. The tongue and groove joint shown in FIG. 1 is a particularly good joint configuration. In addition, in order to keep the contact area to a minimum, the tongue 24 of the end closure 25 should be rather loosely fitted into the groove 23 of the sleeve 13.

With reference now to FIG. 2, there is shown another type of capacitor having axial leads extending from convolutely wound capacitor body 10'. The leads are electrically connected to terminals 32 and 33 through suitable means such as rivets 34 and 35. In this particular illustration, the end closure for sleeve 13' consists of another similar sleeve 13". The sleeves are joined through a similar tongue and groove joint formed by tongue 24" of sleeve 13" fitting into groove 23' of sleeve 13'. An integral bond between the sleeves is formed in like manner as was done in the capacitor of FIG. 1 by bringing welding head 26' having horn 27' extending therefrom against the face 36 of sleeve 13" and applying an ultrasonic vibrating frequency to the face.

Thus the present invention describes a method of sealing end closures to sleeves holding electronic components such as capacitors and batteries to form a single unitarily constructed encapsulating container for such components. Since many widely different embodiments of the invention may be made without departing from the scope thereof, it is intended that all matter contained in the above description and shown in the accompanying drawing shall be interposed as illustrative and not in a limiting sense.

What is claimed is:

1. In a method for encapsulating a capacitor body wherein a foil sheet interwound with an absorbent material forms a convolutely wound capacitor body impregnated with a liquid electrolyte and having terminals wires extending from said body, and wherein said body is inserted into an encapsulating container substantially equivalent in shape to said body and having electrical terminals electrically connected to said terminal wires, and wherein said container is fabricated from a thermoplastic material in two sections, and wherein a tongue is formed on one of said sections and a groove on the other of said sections for mating the sections together, the improvement comprising: loosely fitting said sections together for forming said container with said tongue fitting into said groove in a joint of minimal contact area between said tongue and groove for preventing said sections from constituting a heat sink upon heat being generated at said joint; applying an ultrasonic vibration to one of said sections for producing ultrasonic wave energy traveling radially through said sections and producing heat at the joint formed by said sections mated together, whereby said sections are integrally bonded into a single unitary container encapsulating said body.

2. In a method of encapsulating a capacitor body according to claim 1 in which said sections essentially consist of a thermoplastic material taken from the class consisting of polypropylene, polyamide, polystyrene, polycarbonate and polyacetate resins.

* * * * *